United States Patent
Kim et al.

(10) Patent No.: US 11,499,898 B2
(45) Date of Patent: Nov. 15, 2022

(54) ANISOTROPIC MECHANICAL EXPANSION SUBSTRATE AND CRACK-BASED PRESSURE SENSOR USING THE ANISOTROPIC SUBSTRATE

(71) Applicant: Research & Business Foundation Sungkyunkwan University, Suwon-si (KR)

(72) Inventors: Tae Il Kim, Suwon-si (KR); Byeong Hak Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/574,037

(22) Filed: Jan. 12, 2022

(65) Prior Publication Data

US 2022/0221385 A1    Jul. 14, 2022

(30) Foreign Application Priority Data

Jan. 13, 2021    (KR) .................. 10-2021-0004399

(51) Int. Cl.
*G01N 3/00*    (2006.01)
*G01N 3/12*    (2006.01)

(52) U.S. Cl.
CPC ....... *G01N 3/12* (2013.01); *G01N 2203/0066* (2013.01); *G01N 2203/0067* (2013.01)

(58) Field of Classification Search
CPC ............. G01N 3/12; G01N 2203/0066; G01N 2203/0067
See application file for complete search history.

(56) References Cited

U.S. PATENT DOCUMENTS

| | | | | |
|---|---|---|---|---|
| 9,046,793 | B2 * | 6/2015 | Suehira | ................. G03F 7/0002 |
| 2006/0065136 | A1 * | 3/2006 | Takahashi | ............. B29C 59/022 |
| | | | | 101/3.1 |
| 2008/0129931 | A1 * | 6/2008 | Takahashi | ............ G02B 5/3058 |
| | | | | 359/487.03 |
| 2010/0213169 | A1 * | 8/2010 | Hiraoka | ................ B32B 27/306 |
| | | | | 216/41 |
| 2012/0115250 | A1 * | 5/2012 | Ariga | ..................... G11B 5/855 |
| | | | | 438/608 |
| 2016/0131564 | A1 | 5/2016 | Hossain et al. | |

(Continued)

FOREIGN PATENT DOCUMENTS

JP    2014-011282 A    1/2014

*Primary Examiner* — Max H Noori
*Assistant Examiner* — Masoud H Noori
(74) *Attorney, Agent, or Firm* — NSIP Law

(57) ABSTRACT

Disclosed are an anisotropic mechanical expansion (anisotropic Poisson's ratio) substrate and a crack-based pressure sensor using the same. The substrate having an anisotropic Poisson's ratio includes a first layer having linear concave and convex patterns arranged in parallel to each other on a surface thereof; and a second layer having linear convex and concave patterns respectively engaged with the linear concave and convex patterns of the first layer on a surface thereof, wherein the first layer and the second layer are stacked with each other so that the linear convex and concave patterns of the second layer are respectively engaged with the linear concave and convex patterns of the first layer, wherein an elastic modulus of the first layer is different from an elastic modulus of the second layer.

5 Claims, 6 Drawing Sheets

(56) References Cited

U.S. PATENT DOCUMENTS

| | | | |
|---|---|---|---|
| 2017/0207248 A1* | 7/2017 | Sun | H01L 29/66742 |
| 2017/0315281 A1* | 11/2017 | Suto | G02B 5/30 |
| 2018/0246165 A1* | 8/2018 | Kim | H01L 22/20 |
| 2020/0278481 A1* | 9/2020 | Yaegashi | B29D 11/00769 |
| 2022/0121109 A1* | 4/2022 | Narahara | G03F 1/24 |
| 2022/0161593 A1* | 5/2022 | Nishine | B32B 27/42 |

* cited by examiner

ANISOTROPIC MECHANICAL EXPANSION SUBSTRATE AND CRACK-BASED PRESSURE SENSOR USING THE ANISOTROPIC SUBSTRATE

CROSS-REFERENCE TO RELATED APPLICATION

This application claims the benefit under 35 U.S.C. § 119(a) of Korean Patent Application No. 10-2021-0004399 filed on Jan. 13, 2021, in the Korean Intellectual Property Office, the entire disclosure of which is incorporated herein by reference for all purposes.

BACKGROUND

Field

The present disclosure relates to an anisotropic mechanical expansion (anisotropic Poisson's ratio) substrate and a crack-based pressure sensor using the same.

Description of Related Art

Mechanical signals generated from a human body include important physiological information that may be utilized in medical diagnosis, such as a blood pressure, a heart rate, body movement, neck vibration, ulceration, biting, and intracranial pressure. These signals may include a wide range of pressures, frequencies, and deformations. A directionality of signal propagation is also an important factor to be detected.

Recent research on mechanical sensors has been made on novel materials and structures that allow these sensors to be suitable for detecting the physiological signals. Among various mechanical sensors, a nanoscale crack-based sensor has a significant advantage in terms of excellent sensitivity. This crack-based sensor is disclosed in Korean Patent Nos. 10-2104944 and 10-2044152. This crack-based sensor is capable of detecting a minute mechanical signal (2% deformation) with a gauge factor equal to or larger than 16,000. However, the crack-based sensor is manufactured in a planar shape such that thin metal cracks are vertically aligned on the plane. Because of a form factor of a current sensor design, only a mechanical signal that causes deformation in the plane direction may be detected. Adding trench or pop-up geometries in the sensor design may reduce directional constraints in the signal detection. However, fabrication thereof is often inefficient and difficult.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present inventor newly discovers that, when a crack-based sensor is used as a pressure sensor, the crack-based sensor has a structural limitation in that the sensor detects a signal only based on in-plane deformation having a specific directionality. Thus, the present disclosure is to overcome this problem.

The present inventor newly conceives a fact that in order that this crack-based sensor is used as a pressure sensor, a substrate on which a crack-based sensor plane is disposed has an anisotropic Poisson' ratio. Thus, the present disclosure aims to provide an anisotropic Poisson's ratio substrate (APS) suitable for the fact.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

One aspect of the present disclosure provides a substrate having an anisotropic Poisson's ratio, the substrates comprising: a first layer having linear concave and convex patterns arranged in parallel to each other on a surface thereof; and a second layer having linear convex and concave patterns respectively engaged with the linear concave and convex patterns of the first layer on a surface thereof, wherein the first layer and the second layer are stacked with each other so that the linear convex and concave patterns of the second layer are respectively engaged with the linear concave and convex patterns of the first layer, wherein an elastic modulus of the first layer is different from an elastic modulus of the second layer.

In one implementation of the substrate, a cross-section of each of the linear convex and concave patterns of each of the first and second layers has a round shape, a polygonal shape or a combination thereof.

In one implementation of the substrate, a cross-section of each of the linear convex and concave patterns of each of the first and second layers has a half-honeycomb structure.

In one implementation of the substrate, the substrate is anisotropic such that an elongation amount of the substrate in a direction (x) perpendicular to a longitudinal direction (y) of each linear pattern with respect to a decrease amount of a dimension of the substrate in a thickness direction (z) thereof is larger than an elongation amount of the substrate in the longitudinal direction (y) of each linear pattern with respect to the decrease amount of the dimension of the substrate in the thickness direction (z) thereof.

In one implementation of the substrate, the substrate is anisotropic such that a Poisson ratio ($\upsilon_{zx}$) is larger than a Poisson ratio ($\upsilon_{zy}$), wherein the Poisson ratio ($\upsilon_{zx}$) is defined as an elongation amount of the substrate in a direction (x) perpendicular to a longitudinal direction (y) of each linear pattern with respect to a decrease amount of a dimension of the substrate in a thickness direction (z) thereof, wherein the Poisson ratio ($\upsilon_{zy}$) is defined as an elongation amount of the substrate in the longitudinal direction (y) of each linear pattern with respect to the decrease amount of the dimension of the substrate in the thickness direction (z) thereof.

One aspect of the present disclosure provides a pressure sensor comprising: a substrate having an anisotropic Poisson's ratio; and a crack-based sensor layer disposed on the substrate, wherein the sensor layer includes a conductive layer having cracks on a surface thereof, wherein the cracks are arranged parallel to a direction in which a Poisson's ratio of the substrate is smaller, wherein the pressure sensor is capable of measuring a pressure applied to a surface of the substrate.

In one implementation of the pressure sensor, the substrate having the anisotropic Poisson's ratio includes: a first layer having linear concave and convex patterns arranged in parallel to each other on a surface thereof; and a second layer having linear convex and concave patterns respectively engaged with the linear concave and convex patterns of the first layer on a surface thereof, wherein the first layer and the second layer are stacked with each other so that the linear convex and concave patterns of the second layer are respectively engaged with the linear concave and convex patterns of the first layer, wherein an elastic modulus of the first layer is different from an elastic modulus of the second layer.

In one implementation of the pressure sensor, a cross-section of each of the linear convex and concave patterns of each of the first and second layers has a round shape, a polygonal shape or a combination thereof.

In one implementation of the pressure sensor, a cross-section of each of the linear convex and concave patterns of each of the first and second layers has a half-honeycomb structure.

In one implementation of the pressure sensor, the cracks are arranged in a parallel manner to a direction in which the linear pattern extends.

In one implementation of the pressure sensor, the crack-based sensor layer is disposed on the second layer, wherein the elastic modulus of the first layer is greater than the elastic modulus of the second layer.

In one implementation of the pressure sensor, the substrate is anisotropic such that an elongation amount of the substrate in a direction (x) perpendicular to a longitudinal direction (y) of each linear pattern with respect to a decrease amount of a dimension of the substrate in a thickness direction (z) thereof is larger than an elongation amount of the substrate in the longitudinal direction (y) of each linear pattern with respect to the decrease amount of the dimension of the substrate in the thickness direction (z) thereof.

In one implementation of the pressure sensor, the substrate is anisotropic such that a Poisson ratio ($v_{zx}$) is larger than a Poisson ratio ($v_{zy}$), wherein the Poisson ratio ($v_{zx}$) is defined as an elongation amount of the substrate in a direction (x) perpendicular to a longitudinal direction (y) of each linear pattern with respect to a decrease amount of a dimension of the substrate in a thickness direction (z) thereof, wherein the Poisson ratio ($v_{zy}$) is defined as an elongation amount of the substrate in the longitudinal direction (y) of each linear pattern with respect to the decrease amount of the dimension of the substrate in the thickness direction (z) thereof.

The present disclosure may realize a substrate having anisotropy and expandability, stretchability, or a Poisson's ratio.

The present disclosure may realize a crack-based pressure sensor.

In addition to the effects as described above, specific effects in accordance with the present disclosure will be described together with following detailed descriptions for carrying out the disclosure.

DETAILED DESCRIPTIONS

Figure 1:
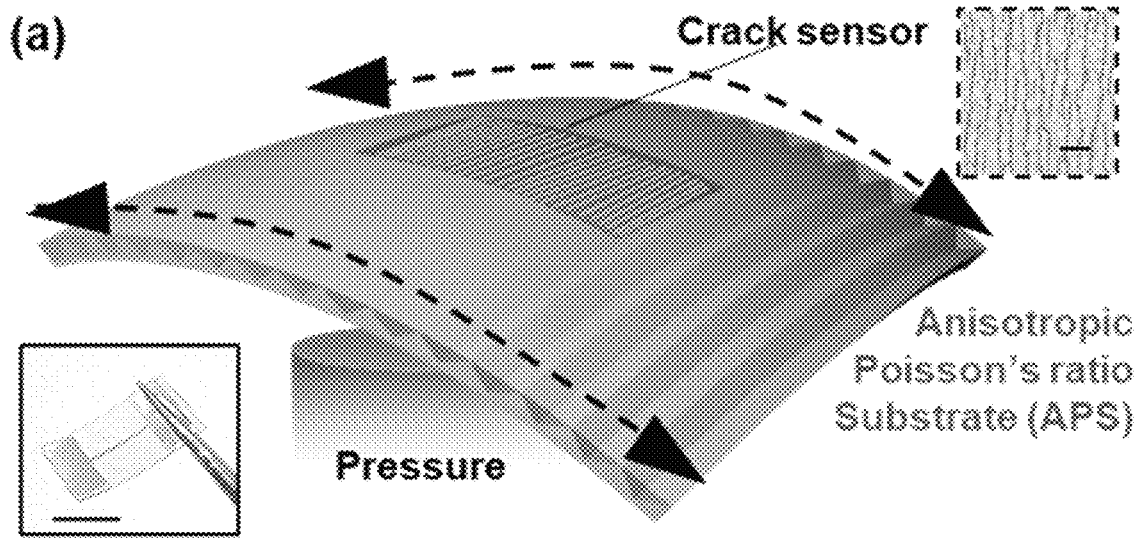
FIG. 1 shows a schematic diagram of a crack-based pressure sensor according to one embodiment of the present disclosure in which a crack-based sensor layer is disposed on an anisotropic Poisson' ratio substrate (APS).

For simplicity and clarity of illustration, elements in the FIGS. are not necessarily drawn to scale. The same reference numbers in different FIGS. represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The sensitivity of the crack-based pressure sensor is based on the increase in resistance due to crack opening when pressure is applied thereto. The present inventor discovers that since cracks are lined fractures having a preferential direction, a vertically applied stress does not cause crack opening in an efficient manner, and therefore, the sensor may not be inherently sensitive to the vertically applied stress. Thus, the present inventor realizes that the crack sensor may be used as a pressure sensor when the Poisson' ratio of the substrate on which the crack is located is increased in an anisotropic manner to maximize lateral deformation in the crack opening direction. In this way, the present disclosure has been completed.

FIG. 1 shows a schematic diagram of a crack-based pressure sensor according to the present disclosure in which a crack-based sensor layer is positioned on an anisotropic Poisson's ratio substrate (APS).

FIG. 1 exemplarily shows that the APS according to the present disclosure is embodied as substrate in which two layers with different modulus of elasticity are stacked in which a cross-section of the stack of the substrate has a half-honeycomb structure (zigzag structure). This structure provides an anisotropic stretch upon vertical pressure application to the substrate. The crack-based sensor may detect fine vertical stress based on lateral deformation of the APS due to anisotropic Poisson's ratio.

[Fabrication of APS Substrate According to the Present Disclosure]

The APS substrate illustrated in FIG. 1 was fabricated in a following way. Triangular groove engraving molds with different inclination angles (15°, 30°, and 45°) were fabricated using UV-curable acrylic polymer via 3D printing (3D MON, Inc., Korea). A mixture of urethane acrylate precursor was put onto each mold to replicate a solid polyurethane acrylate (PUA) (WMR-311, 820.8 MPa modulus, MC Net Co., Korea) pattern. The pattern was gently pressed with a 50 μm thick polyethylene terephthalate film (Minuta Tech, Korea). Then, UV immersion exposure for 12 h using a UV lamp (600 mJ/cm$^2$) polymerized the mold. A soft PUA (SSM-3001, 5.1 MPa modulus, MC Net Co., Korea) was coated on the pre-patterned hard PUA half-honeycomb pattern and was gently pressed to have a uniformly thick layer, followed by 12 h UV exposure for curing of the upper soft PUA. To vary a modulus of the substrate, two PUA precursors were used at various weight fractions (9, 10, 11, 12, and 14 wt % of SSM-3001).

[Fabrication of Nanoscale Crack-Based Sensor]

A 20 nm thick platinum layer was deposited on the APS by sputter-coating (Q300T D, Quorum). To generate and propagate cracks, the film was bent along a rod with a radius of curvature of 1 mm, and an additional tensile force was applied thereto for crack propagation.

As a control, a monolithic substrate was prepared using the same manner and the same material as those in the above example, except that a groove pattern was absent in the mold, and thus an interface between two layers in a vertical cross-section of the substrate was linear.

Figure 2:
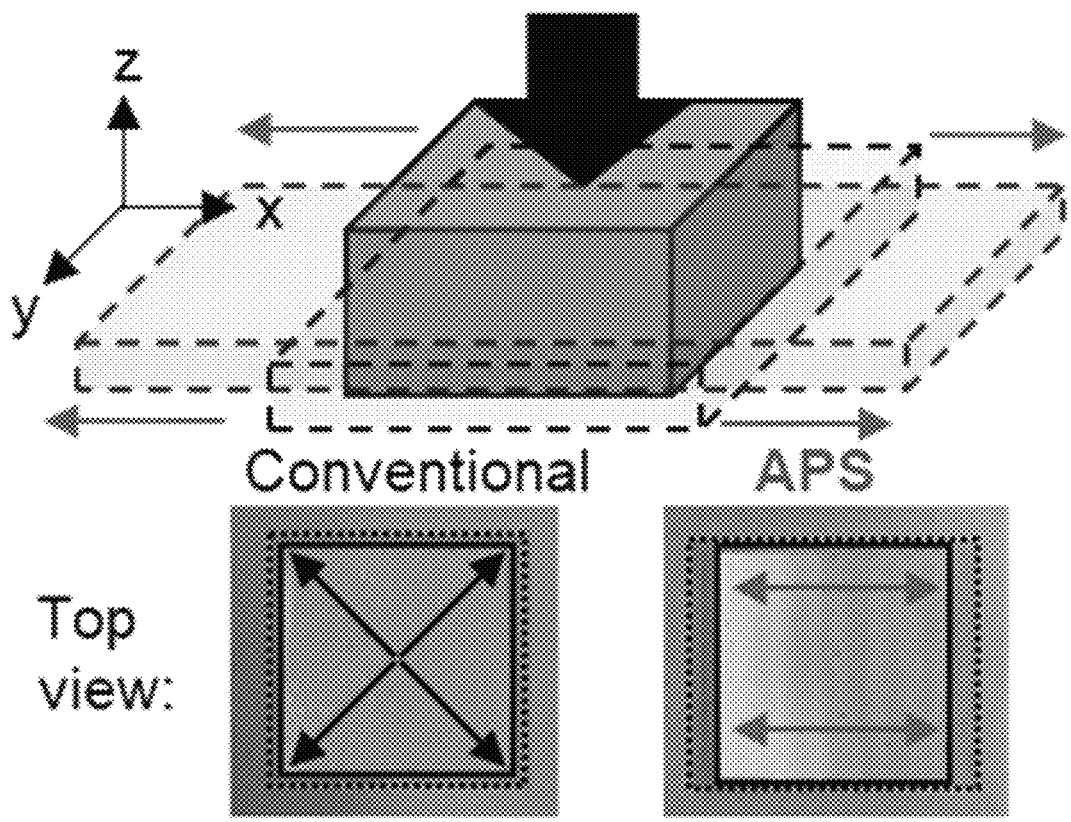
FIG. 2 shows a comparison between mechanical responses to pressure of the APS substrate (red) according to the present disclosure and a monolithic substrate (black) as a control.

FIG. 2 shows a comparison between mechanical responses to pressure of the APS substrate (red) according to the present disclosure and the monolithic substrate (black) as the control. Under compression, a Poisson's ratio may be defined as:

$$\upsilon_{zx} = -\frac{\varepsilon_x}{\varepsilon_z} \quad (1)$$

$$\upsilon_{zy} = -\frac{\varepsilon_y}{\varepsilon_z} \quad (2)$$

where each of $\upsilon_{zx}$ and $\upsilon_{zy}$ refers to a Poisson' ratio defined as a ratio between deformation in an axis of compression (z-direction) and deformation in each of two orthogonal off-axis directions (x and y-direction, respectively). ε represents deformation in each direction.

The monolithic substrate had an isotropic Poisson' ratio (that is, $\upsilon_{zx}=\upsilon_{zy}=\upsilon_{xy}$) with a value ranging from 0 to 0.5 and exhibited a Poisson' ratio of 0.30.

Conversely, the APS exhibited an anisotropic Poisson' ratio having 0.67 of $\upsilon_{zx}$ and 0.11 of $\upsilon_{zy}$. In other words, when the substrate is compressed under a pressure about 10 MPa applied in the z-direction, the APS is compressed by 8.9% in the z-direction, while the APS is stretched by 5.9% and 0.98% in the x- and y-directions, respectively.

Figure 3:
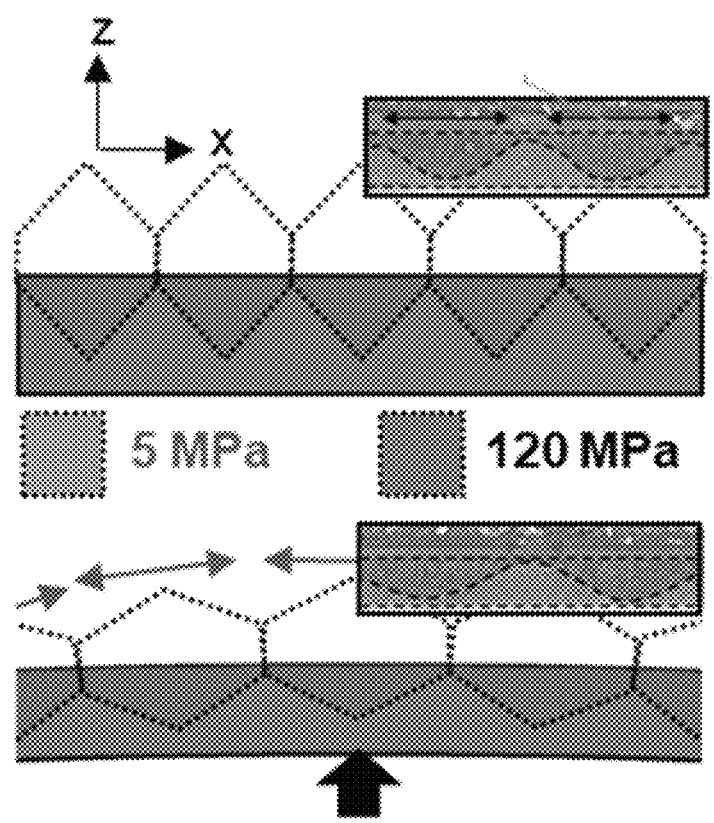
FIG. 3 shows that a cross section of each of the linear concave and convex patterns of the stacked substrate has a half-honeycomb structure (zigzag structure).

A main feature of the present disclosure is a structure (linear concave and convex patterns stacked structure) in which linear concave and convex patterns of the substrate in which two layers with different elastic modulus are stacked are engaged with each other in a stacked manner. In one example, FIG. 3 shows that a cross section of the stack substrate having this linear concave and convex patterns stacked structure has a half-honeycomb structure (zigzag structure). This half-honeycomb pattern (zigzag pattern) includes a first layer including a pattern of triangular poles arranged parallel to each other on a surface thereof; and a second layer having a concave pattern engaged with a convex pattern of the pattern of the first layer and a convex pattern engaged with the concave pattern of the pattern of the first layer on a surface thereof. The patterns of the first layer and the second layer are engaged with each other in a stacked manner.

Figure 7:
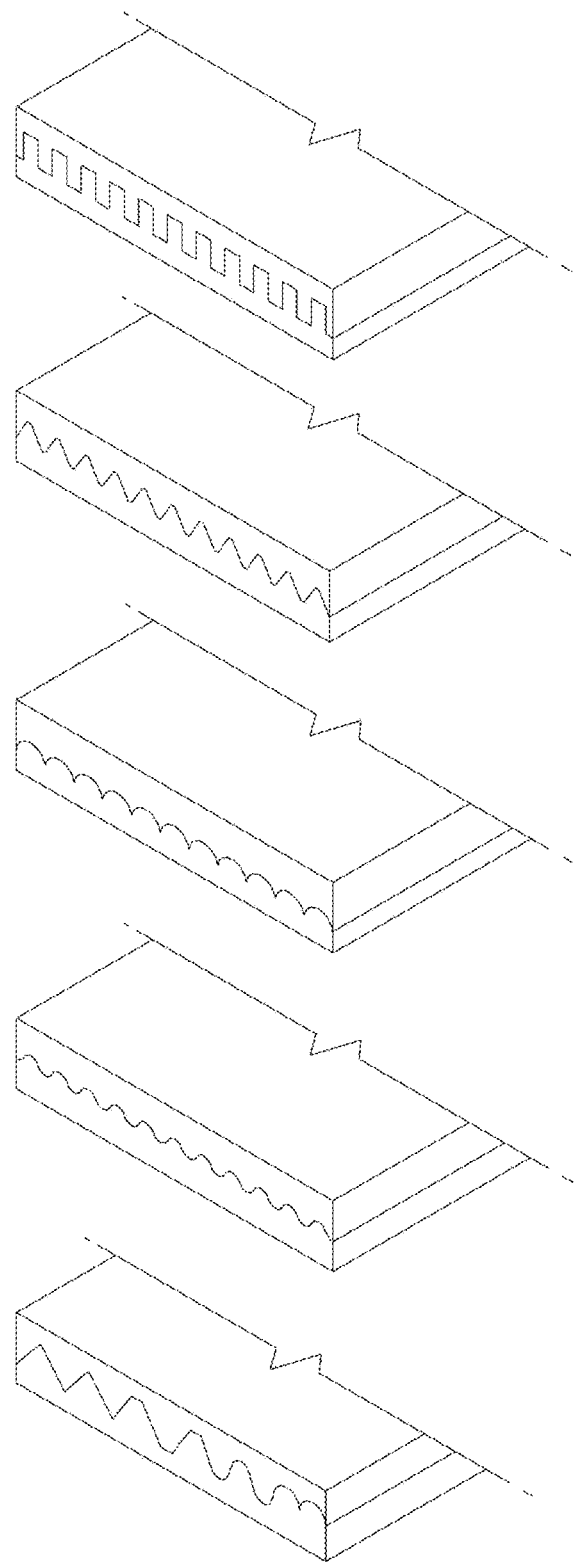
FIG. 7 shows examples of a vertical cross-section of a linear concave and convex pattern in accordance with the present disclosure.

The present disclosure is not limited to the zigzag pattern whose a cross-sectional pattern is a triangle. In the anisotropic substrate according to the present disclosure which elongates in a larger amount in one of two directions perpendicular to the direction of the pressure that in the other of the two directions, a cross-section of each of the concave and convex patterns may have a round shape, a polygonal shape, and a combination thereof, as shown in FIG. 7.

When compressive stress is applied to the linear concave and convex patterns stacked structure in the z direction, off-axis deformation occurs more easily in the x direction than in the y direction. This is because the periodic linear concave and convex pattern in the x-direction promotes deformation, whereas the y-direction has no such structural relief. At the same time, a relatively soft linear concave and convex pattern structure tends to deform more easily than a rigid linear concave and convex pattern structure does. This amplifies the tendency to deform in the x direction.

Therefore, the anisotropy having the Poisson's ratio is determined due to the linear concave and convex pattern structure and the difference between elastic modulus of the two constituent layers. Cross-sectional images of the structure before and after compression (inset in FIG. 3) show that the soft linear concave and convex pattern structure (in FIG. 3, the cross-section is a half-honeycomb structure) undergoes additional deformation when compressive force is applied to the APS, resulting in the additional stretch of the soft linear concave and convex pattern structure. With an improved Poisson' ratio towards the x-direction as $v_{zx}$ in the compression in the z-direction, the APS undergoes an additional stretch in the x-direction. Because cracks are lined fractures that are oriented towards the y direction in the x-y plane, the further stretch in the x direction is effective for crack opening to increase electrical resistance along the x direction.

In the present disclosure, the measurement of the Poisson's ratio of APS is made by capturing a cross-sectional image while a compressive force is applied thereto. A compression force was controlled by a customized stretcher. Deformations in a width and a height of the APS were measured using optical microscopy and Image J software.

In the present disclosure, regarding the electrical characteristics of the crack-based sensor, in order to evaluate the electrical characteristics of the sensor upon applying various levels of pressure thereto, resistance was measured using a digital multimedia system (PXI-4071, National Instrument Inc., USA) while the substrate was pressed under an extreme test machine (UTM; 3342 Machine, Instron Co., USA). A pressure of about 10 MPa was applied thereto at a rate of 5 MPa min$^{-1}$ with repeated loading-unloading of the pressure.

Figure 4:
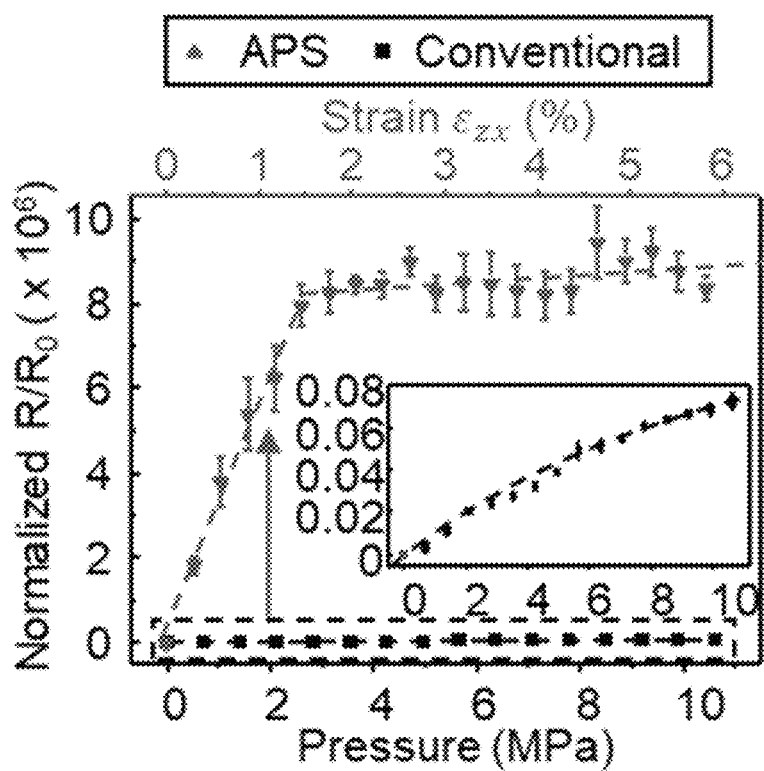
FIG. 4 shows a comparison between relative resistance changes of a sensor disposed on a monolithic PUA substrate and a sensor disposed on the substrate according to the present disclosure.

As a result, it may be identified as shown in FIG. 4 that the resistance change is amplified by more than 620 times when the crack-based pressure sensor is placed on the APS, compared to a case when the sensor is placed on the monolithic PUA substrate. A normalized resistance (R/Ro) profile showed a dramatic increase in sensitivity in a lower pressure range between 0 and 3 MPa with an impressive sensitivity value of $3.1\times10^6$ MPa$^{-1}$ together with notable linearity, even within a pressure range lower than 80 kPa. In the higher pressure range between 3 MPa and 10 MPa, the sensitivity dropped to $8.1\times10^4$ MPa$^{-1}$, but the linearity was still maintained. The improved sensitivity is due to the anisotropic Poisson's ratio which exhibits the highest sensitivity and a wider detection range, compared to other types of pressure sensors. Anisotropy between $\upsilon_{zx}$ and $\upsilon_{zy}$ is equal to a six-fold difference. That is, $\upsilon_{zx}$ has a value of 0.67 and $\upsilon_{zy}$ has a value of 0.11. Briefly, the sensor according to the present disclosure using the stacked half-honeycomb structure in the APS simultaneously achieved both a higher Poisson' ratio in a desired direction $v_{zx}$, and the desired anisotropy.

Figure 5:
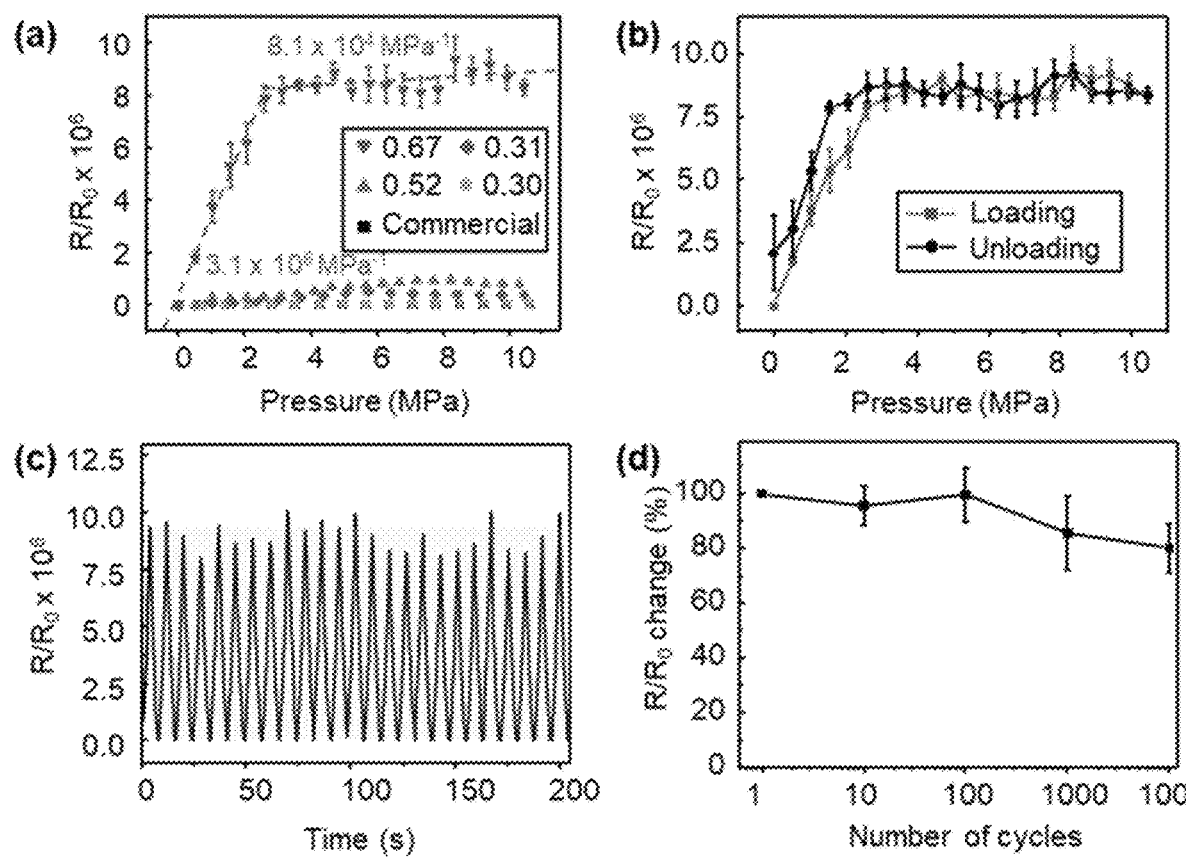
FIG. 5 shows characteristics of the nanoscale crack based pressure sensor fabricated on APS. (a) Resistance profiles of crack based pressure sensors on APS with different Poisson's ratio v_zx. (b) Loading (red) and unloading (black) resistance profiles of crack based pressure sensors (loading and unloading velocity, 50 MPa/min). (c) Resistance changes under 30 cycles of loading and unloading with 10 MPa pressure. (d) Durability test based on normalized resistance.
Figure 6:
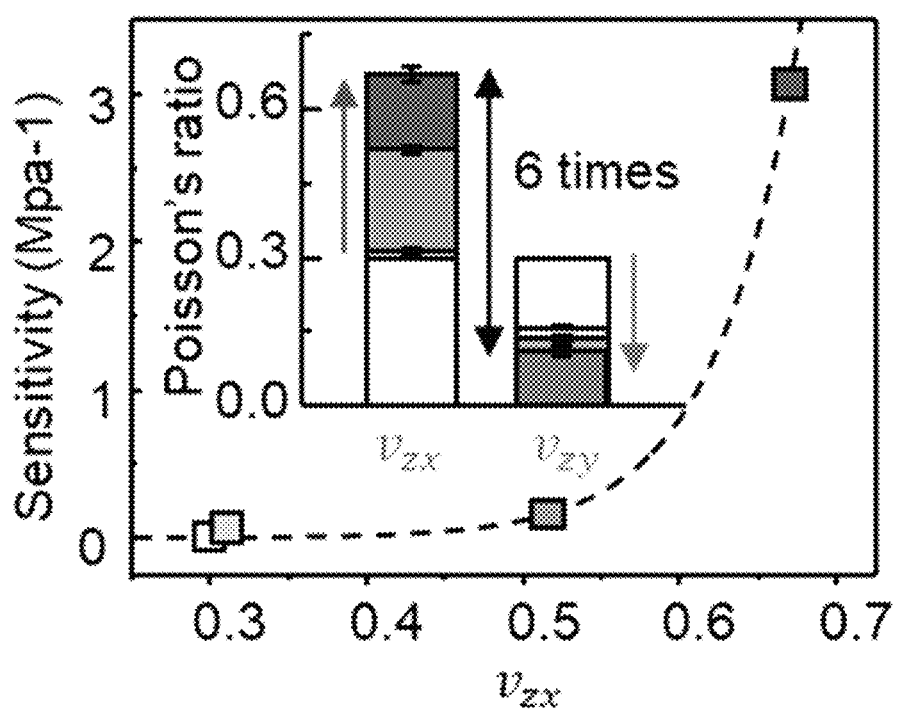
FIG. 6 shows sensitivity and the anisotropic value based on the Poisson's ratio.

FIG. 5 shows that APS in accordance with the present disclosure may have advantages in application thereof to the crack-based sensor. The crack-based sensor according to the present disclosure may be fabricated in a manner as described in the registered patents and papers of the present applicant. The characteristics of the crack-based pressure sensor (45° angle) on the APS may be identified in FIG. 5. The resistance versus pressure profile may be improved by controlling the Poisson' ratio (0.67 in red, 0.52 in green, 0.31 in blue, and 0.3 in purple, and a commercial pressure sensor (RA18, Marveldex, Korea) in black). Because of the anisotropy enhancement of the Poisson's ratio, the resistance curve shows a significant change in the Poisson's ratio, so that the sensitivity may be improved dramatically (see FIG. 6). The resistance curve shows a linearity up to 3 MPa, due to the anisotropic Poisson' ratio. Further, as referenced in (b) in FIG. 5, hysteresis of the resistance curve between loading and unloading is at a negligible level at which the sensor may reversibly operate up to a 10 MPa elastic range. As referenced in (c) In FIG. 5, the crack-based sensor on the APS maintain electrical characteristics within repeated mechanical stimuli. The resistance profile shows a consistent resistance peak within a reasonable resistance tolerance. The change in the sensitivity over repeated 10 MPa compression cycles may be identified in (d) in FIG. 5. The sensor exhibits durability up to 10,000 cycles with negligible sensitivity drop.

The present disclosure provides a nanoscale crack-based pressure sensor having an anisotropic Poisson' ratio substrate (APS). The anisotropy enhancement of the Poisson's ratio may be associated with the pressure dependence of crack-based sensors that do not have a cause of the pressure. The two concave and convex patterns cross-sectional structures with different modulus serve to impart anisotropic properties and improve the Poisson's ratio at the same time, so that the substrate may exhibit the $\upsilon_x$ value of 0.3 to 0.67 and the $\upsilon_y$ value of 0.11. Therefore, the crack-based sensor on the APS may improve the pressure sensitivity linearly to $3.1\times10^6$ MPa, and may exhibit durability and stability up to 10 MPa.

The advantage and the potential of the sensor according to present disclosure are that the sensor may have diverse applications to the detection of mechanical bio-physiology requiring different orientations and a wide range of sensitivities. The sensor according to the present disclosure could be utilized in a jaw rehabilitation device for a patient suffering from dysphagia. The crack-based sensor array integrated with the 3D printed brace may precisely detect the pressure balance on the chewing so that proper guidance may be expected. These anisotropic strategies may be facilitated in bioelectronics requiring multi-directionality, precision, and a wide range of mechanical stimuli.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A pressure sensor comprising:
   a substrate having an anisotropic Poisson's ratio;
   a crack-based sensor layer disposed on the substrate,
   wherein the sensor layer includes a conductive layer having cracks on a surface thereof,
   wherein the cracks are arranged parallel to a direction in which a Poisson's ratio of the substrate is smaller,
   wherein the pressure sensor is capable of measuring a pressure applied to a surface of the substrate,
   wherein the substrates comprising:
   a first layer having linear concave and convex patterns arranged in parallel to each other on a surface thereof; and
   a second layer having linear convex and concave patterns respectively engaged with the linear concave and convex patterns of the first layer on a surface thereof,
   wherein the first layer and the second layer are stacked with each other so that the linear convex and concave patterns of the second layer are respectively engaged with the linear concave and convex patterns of the first layer,
   wherein an elastic modulus of the first layer is different from an elastic modulus of the second layer,
   wherein the substrate is anisotropic such that an elongation amount of the substrate in a direction (x) perpendicular to a longitudinal direction (y) of each linear pattern with respect to a decrease amount of a dimension of the substrate in a thickness direction (z) thereof is larger than an elongation amount of the substrate in the longitudinal direction (y) of each linear pattern with respect to the decrease amount of the dimension of the substrate in the thickness direction (z) thereof, or the substrate is anisotropic such that a Poisson ratio ($u_{zx}$) is larger than a Poisson ratio ($u_{zy}$),
   wherein the Poisson ratio ($u_{zx}$) is defined as an elongation amount of the substrate in a direction (x) perpendicular to a longitudinal direction (y) of each linear pattern with respect to a decrease amount of a dimension of the substrate in a thickness direction (z) thereof, and
   wherein the Poisson ratio ($u_{zy}$) is defined as an elongation amount of the substrate in the longitudinal direction (y) of each linear pattern with respect to the decrease amount of the dimension of the substrate in the thickness direction (z) thereof.

2. The substrate of claim 1, wherein a cross-section of each of the linear convex and concave patterns of each of the first and second layers has a round shape, a polygonal shape or a combination thereof.

3. The substrate of claim 1, wherein a cross-section of each of the linear convex and concave patterns of each of the first and second layers has a half-honeycomb structure.

4. The pressure sensor of claim 1, wherein the cracks are arranged in a parallel manner to a direction in which the linear pattern extends.

5. The pressure sensor of claim 1,
   wherein the crack-based sensor layer is disposed on the second layer, and
   wherein the elastic modulus of the first layer is greater than the elastic modulus of the second layer.

* * * * *